US012755126B2

(12) United States Patent
Jeong et al.

(10) Patent No.: US 12,755,126 B2
(45) Date of Patent: Oct. 6, 2026

(54) WIRELESS IC METAL CARD WITH CLAD METAL STRUCTURE FORMED THEREON AND METHOD OF MANUFACTURING SAME

(71) Applicant: KONA M CO., LTD., Chungcheongbuk-do (KR)

(72) Inventors: Young Hoon Jeong, Seosan-si (KR); Jae Min Yang, Jincheon-gun (KR); Ki Sung Nam, Jincheon-gun (KR)

(73) Assignee: KONA M CO., LTD., Chungcheongbuk-do (KR)

( * ) Notice: Subject to any disclaimer, the term of this patent is extended or adjusted under 35 U.S.C. 154(b) by 0 days.

(21) Appl. No.: 18/868,115

(22) PCT Filed: Jun. 1, 2023

(86) PCT No.: PCT/KR2023/007509

§ 371 (c)(1),
(2) Date: Nov. 21, 2024

(87) PCT Pub. No.: WO2023/239108

PCT Pub. Date: Dec. 14, 2023

(65) Prior Publication Data

US 2025/0328748 A1 Oct. 23, 2025

(30) Foreign Application Priority Data

Jun. 10, 2022 (KR) ........................ 10-2022-0071065

(51) Int. Cl.
*G06K 19/077* (2006.01)

(52) U.S. Cl.
CPC ... *G06K 19/07722* (2013.01); *G06K 19/0775* (2013.01)

(58) Field of Classification Search
CPC ......... G06K 19/07722; G06K 19/0775; G06K 19/02; G06K 19/07769; G06K 19/07771; B21D 39/031; B21D 22/04
See application file for complete search history.

(56) References Cited

U.S. PATENT DOCUMENTS

2017/0017871 A1 1/2017 Finn et al.
2018/0162106 A1* 6/2018 Fujikawa .............. B32B 15/098
2020/0250504 A1* 8/2020 Lotya ..................... G06K 19/02

FOREIGN PATENT DOCUMENTS

KR 10-2017-0120524 A 10/2017
KR 10-2020-0004851 A 1/2020
(Continued)

OTHER PUBLICATIONS

International Search Report and Written Opinion for PCT/KR2023/007509 by Korean Intellectual Property Office dated Sep. 5, 2023.
(Continued)

*Primary Examiner* — Matthew Mikels
(74) *Attorney, Agent, or Firm* — BROADVIEW IP LAW, PC

(57) ABSTRACT

A wireless IC metal card according to an embodiment of the present disclosure may include a first metal layer that receives a wireless IC chip on a top surface thereof; an antenna layer disposed in a partial region of a bottom surface of the first metal layer and electrically connected to the wireless IC chip; a second metal layer disposed below the first metal layer, with the antenna layer interposed therebetween; and a third metal layer disposed below the second metal layer, wherein the first metal layer, the second metal layer, and the third metal layer are bonded to one another to form a clad metal structure.

10 Claims, 5 Drawing Sheets

(56) References Cited

FOREIGN PATENT DOCUMENTS

| | | | |
|---|---|---|---|
| KR | 10-2021-0018504 | A | 2/2021 |
| KR | 10-2021-0018995 | A | 2/2021 |
| KR | 10-2021-0050644 | A | 5/2021 |
| WO | 2021/097208 | A1 | 5/2021 |
| WO | 2021/202821 | A2 | 10/2021 |
| WO | 2021/202821 | A3 | 10/2021 |

OTHER PUBLICATIONS

Office Action for KR 10-2022-0071065 by Korean Intellectual Property Office dated Apr. 27, 2024.

Extended European Search Report for EP 23820044.8 by European Patent Office dated May 22, 2026.

* cited by examiner (a) - Prior art (b) - Present disclosure (a)

(b)

WIRELESS IC METAL CARD WITH CLAD METAL STRUCTURE FORMED THEREON AND METHOD OF MANUFACTURING SAME

CROSS-REFERENCE TO RELATED APPLICATIONS

This application is a National Phase Entry Application of PCT Application No. PCT/KR2023/007509 filed on Jun. 1, 2023, which claims priority to Korean Patent Application No. KR 10-2022-0071065 filed on Jun. 10, 2022, in the Korean Intellectual Property Office, the entire contents of which are hereby incorporated by reference in its entirety.

BACKGROUND OF THE INVENTION

Field of the Invention

The present disclosure relates to a metal card and a method of manufacturing the metal card. More specifically, the present disclosure relates to a wireless IC metal card with a clad metal structure formed thereon and a method of manufacturing the same.

Background of the Related Art

In general, credit cards may be used as a substitute for cash, and in recent years, smart cards with built-in IC chips that can store a large amount of information have been developed, and are being actively used not only for payment but also for various membership cards.

In this smart card market, special cards using various materials are being developed. In particular, a differentiated metallic credit card has been developed for VIP customers, and the metal card has been provided to special customers as a high-quality credit card with a metallic sheen.

In particular, recently, a method of manufacturing a metal card by using a thin-film metal sheet or by thinly coating metal powder has been proposed, but these thin-film metal cards are vulnerable to bending and have poor durability such as corrosion.

In addition, it has been proposed to use duralumin, which is currently used as a material for making aircraft, as a surface of the metal card, which has the characteristics of being light and having high strength. However, due to the inconvenience of processing, only the manufacturing cost is high, and the difficulty in processing emblems, or the like is causing inconvenience in the manufacturing process in terms of convenience and design, and moreover, due to being too light, it is difficult to provide the weight of actual metal, making it difficult to distinguish it from plastic cards.

Moreover, when a wireless IC card is composed of a metal material, an antenna layer connected to a wireless IC chip is provided, and there is a problem that communication performance is reduced due to radio interference from the metal material.

Therefore, there is a need to develop a high-quality metal card that overcomes such limitations of metal cards, facilitates processing to effectively express design aesthetics, and provides the weight characteristic of metal while also being durable and corrosion resistant.

SUMMARY OF THE INVENTION

The present disclosure is contrived to solve the foregoing problems, and an aspect thereof is to provide a wireless IC metal card with a clad metal structure formed thereon using a bonded body of multi-metal layers, and a method of manufacturing the same, thereby providing a high-quality metal card that overcomes such communication limitations of metal cards, facilitates processing to effectively express design aesthetics, and provides the weight characteristic of metal while also being durable and corrosion resistant.

In order to solve the foregoing problems, a wireless IC metal card according to an embodiment of the present disclosure may include a first metal layer that receives a wireless IC chip on a top surface thereof; an antenna layer disposed in a partial region of a bottom surface of the first metal layer and electrically connected to the wireless IC chip; a second metal layer disposed below the first metal layer, with the antenna layer interposed therebetween; and a third metal layer disposed below the second metal layer, wherein the first metal layer, the second metal layer, and the third metal layer are bonded to one another to form a clad metal structure.

In addition, in order to solve the foregoing problems, a method of manufacturing a wireless IC metal card according to an embodiment of the present disclosure may include providing a first metal layer that receives a wireless IC chip on a top surface thereof; disposing an antenna layer electrically connected to the wireless IC chip in a partial region of a bottom surface of the first metal layer; disposing a second metal layer below the first metal layer, with the antenna layer interposed therebetween; disposing a third metal layer below the second metal layer; and forming a clad metal structure by aligning and pressing the first metal layer, the second metal layer, and the third metal layer to bond the first metal layer, the second metal layer, and the third metal layer to one another.

According to an embodiment of the present disclosure, a wireless IC metal card may include a clad metal structure formed by bonding a first metal layer, a second metal layer, and a third metal layer to one another, and may be configured such that an antenna layer electrically connected to a wireless IC chip is positioned between the first metal layer and the second metal layer, thereby supporting a bonded body configuration of various forms of multi-metal material layers using the first metal layer, the second metal layer, and the third metal layer, and allowing the processing of the wireless IC metal card using the same.

Accordingly, a wireless IC metal card according to an embodiment of the present disclosure may form a composite bonded body using the clad metal structuring of various metal materials so as to easily and quickly develop a high-quality metal card that facilitates surface processing to effectively express design aesthetics, provides the weight characteristic of metal through an intermediate layer, overcomes the communication limitations of metal cards according to an interlayer antenna connection configuration, as well as enhances durability and corrosion resistance through preprocessing for each layer.

DETAILED DESCRIPTION OF THE PREFERRED EMBODIMENT

The following description illustrates the principles of the present disclosure. It will thus be appreciated that those skilled in the art will be able to devise various devices that, although not explicitly described or shown in this specification, implement the principles of the present disclosure and are included in the concept and scope of the present disclosure. Furthermore, it should be understood that all conditional terms and embodiments recited in this specification are intended only for pedagogical purposes to aid the reader in understanding the concept of the present disclosure, and are not limited to such specifically recited embodiments and conditions.

For example, throughout the specification, in case where a portion is "connected" to the other portion, it may include a case of being "indirectly connected" to the other portion by interposing a member therebetween as well as a case of being "directly connected" to the other portion. Furthermore, when a portion may "include" a certain element, unless specified otherwise, it may not be construed to exclude another element but may be construed to further include other elements.

Moreover, it should be understood that all detailed description herein reciting the principles, aspects, and embodiments of the present disclosure as well as specific embodiments thereof are intended to encompass both structural and functional equivalents thereof. Additionally, it should be understood that such equivalents include both currently known equivalents as well as equivalents to be developed in the future, that is, any elements developed to perform the same function regardless of its structure.

The foregoing objects, features and advantages will be more obvious through the following detailed description associated with the accompanying drawings, and accordingly, the technological concept of the present disclosure can be easily implemented by a person having ordinary skill in the art to which the present disclosure pertains. In describing the present disclosure, moreover, the detailed description will be omitted when a specific description for publicly known technologies to which the present disclosure pertains is judged to obscure the gist of the present disclosure.

Figure 1:
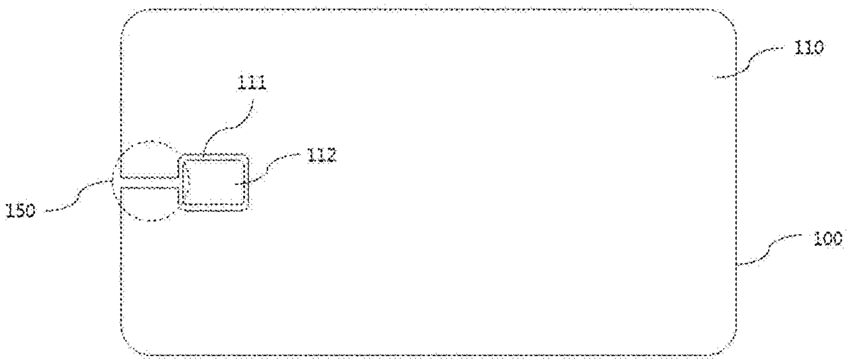
FIG. 1 is a view showing a front side of a wireless IC card according to an embodiment of the present disclosure.
Figure 2:
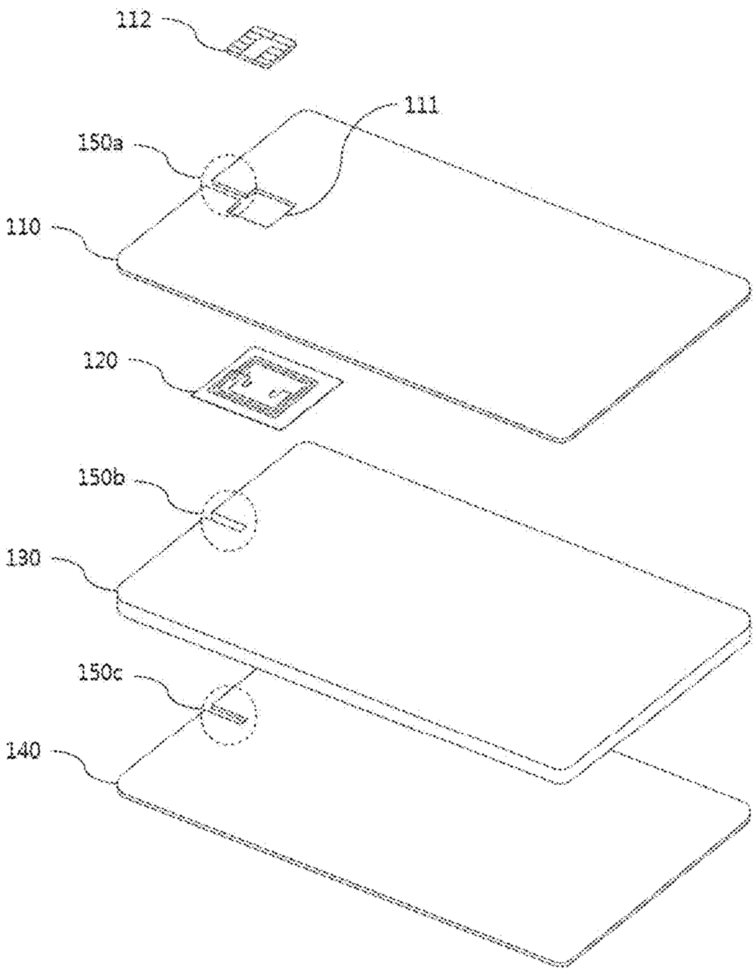
FIG. 2 is an exploded perspective view of a wireless IC card according to an embodiment of the present disclosure.

FIG. 1 is a view showing a front side of a wireless IC card according to an embodiment of the present disclosure, and FIG. 2 is an exploded perspective view of a wireless IC card according to an embodiment of the present disclosure.

Referring to FIGS. 1 and 2, a wireless IC card 100 according to one embodiment of the present disclosure may be illustrated as a credit card having a wireless IC chip 112 mounted on a front side thereof, and characters for identifying the card company may be formed on front and back sides thereof by various methods (printing or marking or etching, NC processing, laser processing, etc.).

In addition, the wireless IC card 100 according to an embodiment of the present disclosure may include a first metal layer 110 that receives a wireless IC chip 112 on a top surface thereof, an antenna layer 120 disposed in a partial region of a bottom surface of the first metal layer 110 and electrically connected to the wireless IC chip 112, a second metal layer 130 disposed below the first metal layer 110 with the antenna layer 120 interposed therebetween, and a third metal layer 140 disposed below the second metal layer 130, and the first metal layer 110, the second metal layer 130, and the third metal layer 140 may be bonded to one another to form a clad metal structure.

Here, the clad metal is difficult to artificially peel off, and has a structure formed such that the tissues of a bonding interface interpenetrate each other, and thus a bonding strength thereof may be further strengthened over time.

Here, the second metal layer 130 positioned in the middle may be formed to have a weight higher than those of the first metal layer 110 and the third metal layer 140 because a metal material thereof is different from those of the first metal layer 110 and the third metal layer 140.

In addition, a thickness of the second metal layer 130 may be formed to be thicker than those of the first metal layer 110 and the third metal layer 140, and thus a weight thereof may be formed to be higher than those of the first metal layer 110 and the third metal layer 140.

Depending on the material and weight combination of the first metal layer 110, the second metal layer 130, and the third metal layer 140, a metal processing technique that improves the weight while allowing various surface processing may be implemented.

That is, each of the metal layers 110, 130, 140 of the wireless IC card 100 according to an embodiment of the present disclosure may be selected by considering not only the material unique to the metal card, but also the durability, wear, and degree of denaturation necessary to withstand the processing process.

Accordingly, for example, the metal card may be manufactured from at least one metal material from among conductors having good elastic resilience, such as super titanium, scandium, titanium, duralumin, stainless steel (SUS), aluminum series, and copper series.

Preferably, the first metal layer 110 and the third metal layer 140 are formed of either one of aluminum and duralumin, and the second metal layer 130 may be formed of either one of nickel and stainless steel.

In the case of aluminum series, since it has high ductility, it is easy to process a surface using a roll pattern or the like, and a surface-processed aluminum material layer may be prevented from corrosion through anodizing treatment prior to bonding.

In addition, preferably, the first metal layer 110 and the third metal layer 140 are made of a stainless steel material, and the second metal layer 130 may be formed of a nickel material.

In the case of a stainless steel material, it has strong durability and is easy to form emblems using NC processing or the like.

In addition, when the second metal layer 130 is composed of a nickel material, it may provide high weight, and thickness adjustment may also be allowed to further increase the weight.

As an example, a metal card composed of SUS as a mother layer may be a corrosion-resistant and heat-treatable material. Heat treatment is a process of heating a metal to a certain temperature and improving the properties or metal structure for a certain purpose depending on the cooling rate.

In addition, the SUS may be processed through a heat treatment process to improve strength and resilience when manufacturing the wireless IC card 100.

On the contrary, as described above, the first metal layer 110 and the third metal layer 140 may be composed of aluminum, and a metal card composed of front and back surfaces made of aluminum is lightweight and highly durable, and is easier to process than other materials, and thus allowed to be manufactured into various shapes. In addition, the aluminum material has excellent usability as it can be subjected to various surface treatments, so a metal card composed of aluminum may be easily applied with various patterns and characters such as emblems.

Meanwhile, as shown in FIG. 2, the wireless IC card 100 according to an embodiment of the present disclosure includes a first metal layer 110, a wireless IC chip 112, an antenna layer 120, a second metal layer 130, and a third metal layer 140.

First, in order to receive the wireless IC chip 112 in the first metal layer 110 of the wireless IC card 100 according to an embodiment of the present disclosure, an IC chip receiving portion 111 may be formed by opening a predetermined region of the first metal layer 110 to receive the wireless IC chip 112.

Here, the IC chip receiving portion 111 may be formed by opening the first metal layer 110 to an area and depth corresponding to the position and shape of the wireless IC chip 112 through punching processing, etching processing, NC processing, or the like, on the first metal layer 110.

Furthermore, the first metal layer 110 according to an embodiment of the present disclosure may include a slit portion 150 formed by cutting from one side of the IC chip receiving portion 111 in an outward direction of the wireless IC card 100, and configured in a form such that at least one of the respective metal layers 110, 130, 140 extends and forms a winding pattern of the antenna layer 120 while reducing wireless signal shielding interference from the metal card.

Accordingly, the slit portion 150 may include a first slit portion 150*a* formed by cutting in an outward direction of the first metal layer 110 from one side of the IC chip receiving portion 111, a second slit portion 150*b* formed by cutting in an outward direction of the second metal layer 130 to correspond to the first slit portion 150*a*, and a third slit portion 150*c* formed by cutting in an outward direction of the third metal layer 140 to correspond to the second slit portion 150*b* so as to form the slit portions 150*a*, 150*b*, 150*c* for the respective metal layers 110, 130, 140.

In an embodiment of the present disclosure as shown in FIG. 2, the cutting widths and directions of the respective slit portions 150*a*, 150*b*, 150*c* are illustrated as being the same, but the cutting widths and directions of one or more of the slit portions may be formed to be different from the other slit portions so as to adjust wireless characteristics, wireless sensitivities, and resonant frequencies.

For example, the slit portions 150*a*, 150*b*, 150*c* may be formed to have a preset width to correspond to a width of the IC chip receiving portion 111 up to an outer edge of the wireless IC card 100, and slit structures having various shapes such as straight lines, zigzags, diagonals, and sawtooth structures may be formed to be identical or different for each of the slit portions 150*a*, 150*b*, 150*c*.

Furthermore, the preset width may be set to be narrower or wider than that of the IC chip receiving portion 111, or may also be set to have the same width.

Here, the slit portions 150*a*, 150*b*, 150*c* may be regions formed by cutting in an outward direction of the wireless IC card 100 so as not to allow the first metal layer 110, the second metal layer 130, and the third metal layer 140 to shield wireless signals, and for the slit portions 150*a*, 150*b*, 150*c*, a finishing member made of a material having electrical insulation may be inserted into at least one of the remaining spaces formed by the respective slit portions 150*a*, 150*b*, 150*c*.

For example, a reinforcing pin or bonded body made of a PVC material, a rubber reinforcing material, or the like may be inserted as the finishing member to maintain an overall shape and durability of the wireless IC card 100, and prevent dust from entering the remaining spaces.

Here, due to a cut structure of the slit portion 150*a*, 150*b*, 150*c*, each metal layer 110, 130, 140 of the wireless IC card 100 has a predetermined inductance corresponding to a wireless magnetic signal. Accordingly, the first metal layer 110, the second metal layer 130, and the third metal layer 140 may function as one winding coil provided in the antenna layer 120 when one or the other end of an antenna of the antenna layer 120 according to an embodiment of the present disclosure is connected thereto.

Accordingly, the first metal layer 110, the second metal layer 130, and the third metal layer 140 themselves may be utilized as a coil of one antenna layer 120, which improves the wireless antenna transmission/reception performance of the wireless IC card 100 while efficiently manufacturing the wireless IC metal card without having a separate shielding layer, or the like.

Furthermore, the antenna layer 120 may be disposed in a predetermined region of the bottom surface of the first metal layer 110, and electrically connected to the wireless IC chip 112 to transmit and receive wireless signals to and from an external device such as a card reader.

Here, the antenna layer 120 may include one or more antenna patterns wound around the IC chip receiving portion 111 to perform a communication function by being electrically connected to a wireless IC chip 112 while transmitting and receiving wireless signals to and from an external device.

Furthermore, the first metal layer 110 and the third metal layer 140 may be composed of a first metal material that allows patterns and characters such as emblems to be formed on a surface of the wireless IC card 100, and the second metal layer 130 may be composed of a second metal material that is intended to increase the weight of the wireless IC card 100.

In addition, the second metal layer 130 may be formed to be thicker than the first metal layer 110 or the third metal layer 140 to increase the weight of the wireless IC card 100.

Accordingly, the first metal layer 110, the second metal layer 130, and the third metal layer 140 may be formed to be different in various manners depending on the stacked structure and materials, and the wireless IC card 100 composed of a clad metal bonded body may be manufactured through an adhesive application and bonding press process between each metal layer.

Here, as a method of bonding between the metal layers, may be illustrated a method of bonding using a thermoplastic or thermosetting adhesive containing ethylene vinyl acetate-based (EVA, ethylene vinyl acetate copolymer), polyolefin, polyamide-based, polyester-based, cellulose-based, nylon-based, and rubber-based (naturally occurring) components.

Accordingly, various examples in which one or more types of metals can be used for the first metal layer 110, the second metal layer 130, and the third metal layer 140 according to an embodiment of the present disclosure are shown in Table 1 below.

TABLE 1

| Embodiment | First metal layer | Second metal layer | Third metal layer | Total weight (Example) |
|---|---|---|---|---|
| 1 | Aluminum (Al) | Nickel | Aluminum (Al) | 20 g |
| 2 | Aluminum (Al) | Stainless steel (SUS) | Aluminum (Al) | 18 g |
| 3 | Stainless steel (SUS) | Nickel | Stainless steel (SUS) | 30 g |
| 4 | Stainless steel (SUS) | Stainless steel (SUS) | Stainless steel (SUS) | 28 g |

As shown in Table 1 above, a total weight of metals may be controlled by using the properties of the metals that can be used.

In addition, the first metal layer 110, the second metal layer 130, and the third metal layer 140 may also change thicknesses of the metals applied thereto, thereby allowing the design of a metal card with a more flexible thickness and weight.

For example, as in the first and second embodiments, aluminum may be used for the material of the first metal layer 110 and the third metal layer 140, and nickel or stainless steel may be used for the material of the second metal layer 130.

Here, in the first and second embodiments, a thickness ratio of the first metal layer 110, the second metal layer 130, and the third metal layer 140 may preferably be applied as 1:2:1, and a weight ratio thereof may preferably be applied as 1:6:1.

More specifically, the weight ratio of the first metal layer 110, the second metal layer 130, and the third metal layer 140 may be calculated as a ratio of a thickness of each metal layer multiplied by a specific gravity of the metal.

For example, in the first embodiment, when the thickness ratio of the first metal layer 110, the second metal layer 130, and the third metal layer 140 is applied as 1:2:1, the specific gravity of aluminum is 2.7 and the specific gravity of nickel is 8.8, and thus the weight ratio of the first metal layer 110, the second metal layer 130, and the third metal layer 140 may preferably be calculated as 1:6:1.

In addition, as in the third embodiment, stainless steel (SUS) may be used for the material of the first metal layer 110 and the third metal layer 140, and nickel or stainless steel may be used for the material of the second metal layer 130.

For example, in the third embodiment, the thickness ratio of the first metal layer 110, the second metal layer 130, and the third metal layer 140 may be applied as 1:2:1, and the weight ratio thereof may be approximately 1:2:1. For example, when the thickness ratio of the first metal layer 110, the second metal layer 130, and the third metal layer 140 is applied as 1:2:1, the specific gravity of stainless steel is 7.9 and the specific gravity of nickel is 8.8, and thus the weight ratio of the first metal layer 110, the second metal layer 130, and the third metal layer 140 may be calculated as approximately 1:2:1.

Figure 3:
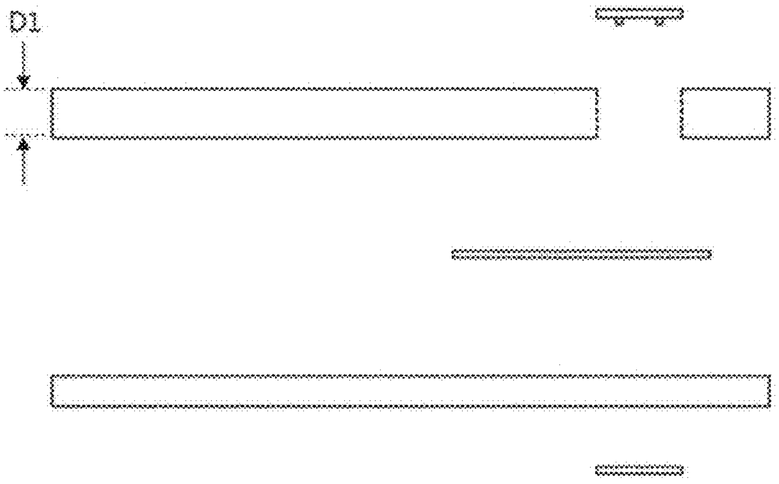
FIG. 3 is a side view of a wireless IC card according to an embodiment of the present disclosure.
Figure 3:
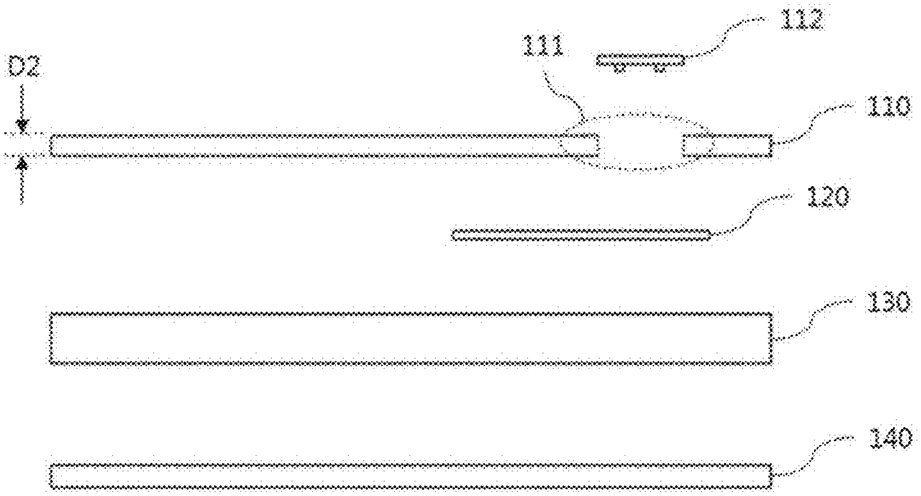

FIG. 3 is a side view of a wireless IC card according to an embodiment of the present disclosure.

First, referring to (a) of FIG. 3 as in the prior art, a metal card utilizing duralumin having the characteristics of being lightweight and having high strength is formed by opening a predetermined region of a top metal layer of a duralumin material having a thickness of D1 to receive a wireless IC chip, and the wireless IC chip is connected to an antenna circuit in the middle, and a bottom metal layer of a duralumin material and a rear finishing member are continuously disposed and bonded on the bottom surface thereof. Typically, a thickness of D1 is formed to be above 0.8 T (0.8 mm) to provide a sense of weight of the metal or the like.

However, this type of metal card is not easy to pattern on front and rear surfaces thereof due to the high hardness of duralumin, and when processing the IC chip receiving portion, high energy is required to penetrate the top metal layer due to its high thickness, which reduces productivity and increases defect rate.

In contrast, referring to (b) of FIG. 3, a wireless IC card 100 according to an embodiment of the present disclosure may have a first metal layer 110 and a third metal layer 140 made of an aluminum material having a thickness of D2, and a predetermined region of the first metal layer 110 may be formed to be open to receive the wireless IC chip 112.

Furthermore, the thickness of D2 may be formed to be thin, for example, as 0.2 T (0.2 mm), and thus the IC chip receiving portion 111 opened through punching processing, etching processing, or NC processing may be formed with very low energy, thereby increasing processing efficiency.

Accordingly, since an NC processing thickness for forming the IC chip receiving portion 111 is also reduced while the processing is easier than in the prior art, the wireless IC card 100 according to an embodiment of the present disclosure proposed in (b) of FIG. 3 may reduce defect rate while improving productivity.

Nonetheless, the wireless IC card 100 according to an embodiment of the present disclosure may be designed with improved weight by disposing the second metal layer 130 having a weight between the antenna layer 120 and the third metal layer 140 so as to allow a user to feel more of the inherent weight of metal.

In addition, a ductile material such as aluminum for the first metal layer 110 and the third metal layer 140 may be used, thereby facilitating the formation of patterns and characters such as emblems through a rolling process, and implementing various colors.

Figure 4:
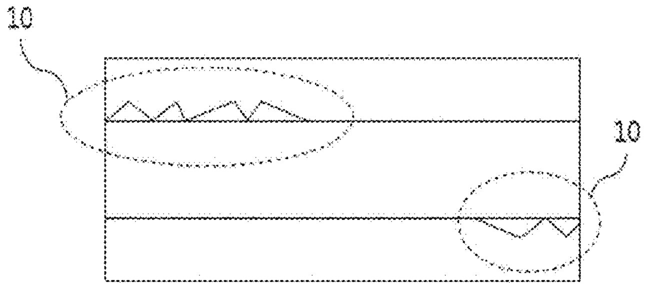
FIG. 4 is a view for explaining corrosion and prevention of corrosion on a wireless IC card according to an embodiment of the present disclosure.
Figure 4:
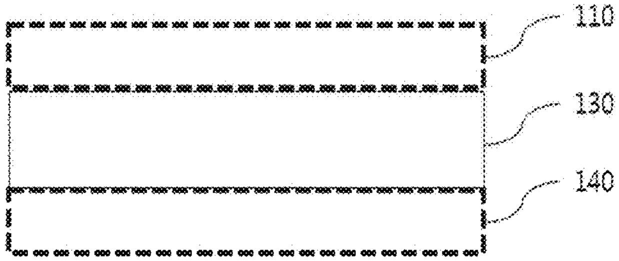

FIG. 4 is a view for explaining corrosion and prevention of corrosion on a wireless IC card according to an embodiment of the present disclosure.

(a) of FIG. 4 is a view showing typical contact corrosion caused by a potential difference between two metals due to a contact between dissimilar metals.

Referring to (a) of FIG. 4, for example, aluminum may be used for the first and third metal layers that are bonded to each other, and a copper series may be bonded to the second metal layer in the middle to increase weight so as to constitute a clad metal.

Here, as electrons in negatively charged copper are attracted to positively charged aluminum, bimetallic corrosion (galvanic corrosion) may occur at a bonding portion between the first metal layer and the third metal layer using aluminum as a first metal due to a potential difference between two different metals, as shown in a corrosion region 10, and may be formed with an uneven color.

In addition, as another embodiment, when stainless steel (SUS) is used as the first metal for the material of the first metal layer and the third metal layer, and copper is used as a second metal for the material of the second metal layer, electrons in the stainless steel (SUS) having a relatively negative polarity are attracted to the copper having a positive polarity to cause bimetallic corrosion (galvanic corrosion) in the copper, which is the second metal layer, and electrons in the stainless steel, which is the first metal or the third metal having a relatively negative polarity, are attracted to the copper, which is the second metal having a positive polarity, to cause corrosion in the copper.

Accordingly, in order to prevent the contact corrosion from occurring, prior to stacking the first metal layer 110, the second metal layer 130, and the third metal layer 140, an anodizing treatment or other insulating treatments for insulation may be carried out on the surfaces of the first metal layer 110 and the third metal layer 140 using aluminum or stainless steel.

(b) of FIG. 4 is a view showing a stack of insulation-treated metals to prevent contact corrosion between dissimilar metals.

For example, as shown in (b) of FIG. 4, for the first metal layer 110 and the third metal layer 140 indicated by a dotted line, as a type of aluminum coating, an anodizing treatment for insulation may be carried out on a surface of aluminum to enhance corrosion resistance that prevents contact corrosion between dissimilar metals.

Accordingly, the anodized first metal layer 110 and the third metal layer 140 may reduce the occurrence of oxidation in contact with the second metal layer 130, which increases the weight of the wireless IC card 100, thereby preventing contact corrosion between dissimilar metals and reducing the possibility of discoloration due to the surrounding environment.

In addition, the anodized aluminum may preserve the natural feel and texture of the metal, allow for a wider variety of color selections, and allow the color of the anodized surface to be consistently and evenly distributed.

Furthermore, as another embodiment, for the first metal layer 110 and the third metal layer 140 made of a stainless steel (SUS) material, an insulation treatment may be carried on the first metal layer 110 and the third metal layer 140 to prevent contact corrosion with the second metal layer 130 made of a copper material.

Accordingly, the phenomenon of corrosion occurring in the second metal layer 130 may be prevented, and laser processing may be carried out on the stainless steel (SUS), which is the material of the first metal layer 110, to manufacture the wireless IC card 100 to which a design is applied.

Figure 5:
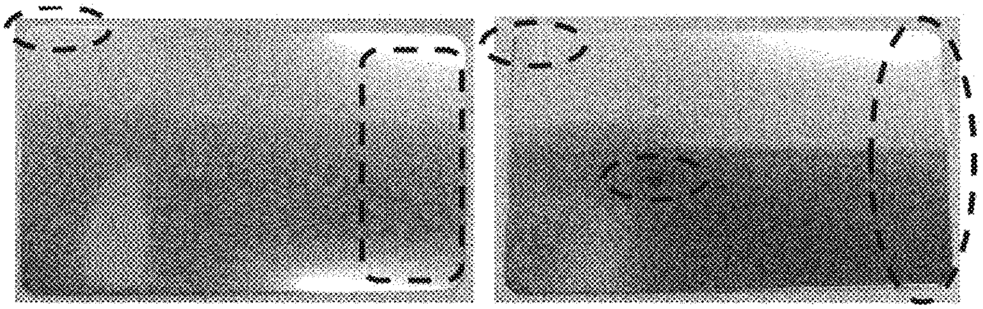
FIG. 5 is a view showing a corrosion state that may occur when applying clad metal to a wireless IC card.

FIG. 5 is a view showing a corrosion state that may occur when applying clad metal to a wireless IC card.

Referring to FIG. 5, in the wireless IC card 100, when aluminum is used for the material of the first metal layer 110 and the third metal layer 140, and copper is used for the material of the second metal layer 130, electrons in the copper having a relatively negative polarity are attracted to the aluminum having a positive polarity to cause corrosion in the aluminum.

In addition, as shown in FIG. 5, corrosion may occur in the first metal layer and the third metal layer using aluminum, and the wireless IC card 100 may be formed with an uneven color as a whole.

Accordingly, in order to prevent bimetallic corrosion (galvanic corrosion) caused by a potential difference between two different metals, an insulating treatment such as anodizing may be preferably carried out on at least one of two metal layers.

Figure 6:
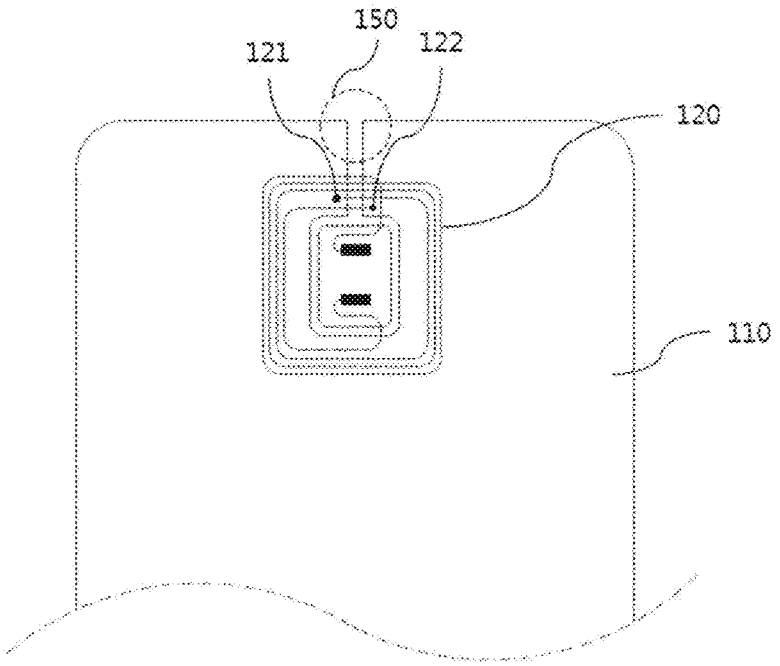
FIG. 6 is a view for explaining an arrangement pattern of an antenna layer according to an embodiment of the present disclosure.

FIG. 6 is a view for explaining an arrangement pattern of an antenna layer according to an embodiment of the present disclosure.

Referring to FIG. 6, the antenna layer 120 may be disposed on a bottom surface of the first metal layer 110, and electrically connected to the wireless IC chip 112 to transmit and receive wireless signals to and from an external device such as a card reader.

Here, the antenna layer 120 may include one or more antenna patterns wound around the IC chip receiving portion 111 to perform a communication function by being electrically connected to the wireless IC chip 112 while transmitting and receiving wireless signals to and from an external device.

Furthermore, the antenna layer 120 may be bonded and connected to allow the wireless IC card 100 to form one turn of the antenna pattern, and the antenna layer 120 may have one end and the other end of each pattern connected to at least one of a first bonding position 121 of the first metal layer 110 and a second bonding position 122 of the second metal layer 130.

More specifically, the antenna layer 120 may be connected to the first bonding position 121 of the first metal layer 110 where one end of a first pattern is adjacent to the slit portion 150 by a first preset distance.

Furthermore, the other end of the first pattern may be electrically connected to the second bonding position 122 of the second metal layer 130 or the third metal layer 140 adjacent to the slit portion 150 by a preset second distance, and thus the first pattern may be formed to extend in a direction continuous with a winding direction of the antenna layer 120 through at least one of the first metal layer 110, the second metal layer 130, and the third metal layer 140.

In addition, one end and the other end of each of the patterns may be electrically connected to the first bonding position 121 of the first metal layer 110 and the second bonding position 122 of the second metal layer 130 or the third metal layer 140, and an adhesive material having anisotropic conductive properties may be used. For example, there may be illustrated an anisotropic conductive film (ACF), an anisotropic conductive paste (ACP), a conductive adhesive, a surface mount technology (SMT) or the like.

In addition, for such a winding connection, the first bonding position 121 may be predesignated to a preset position where at least part of the first metal layer 110 provided with the first slit portion 150*a* constitutes a winding of the first pattern.

In addition, the second bonding position 122 may be predesignated to a preset position where at least part of a bonded body of the second metal layer 130 and the third metal layer 140 constitutes a winding of the first pattern.

Accordingly, in the wireless IC metal card 100 according to an embodiment of the present disclosure, the metal layers 110, 130, 140 formed with respective slits may be used as a winding pattern extended from an antenna pattern of the antenna layer 120, and thus the metal layers 110, 130, 140 formed with respective slits may function as an extended antenna pattern.

Therefore, in the wireless IC metal card 100 according to an embodiment of the present disclosure, the body may function as a single antenna using a clad metal bonded body without a separate shielding layer or the like, thereby forming efficient wireless communication sensitivity and overcoming the communication limitations of metal cards.

Figure 7:
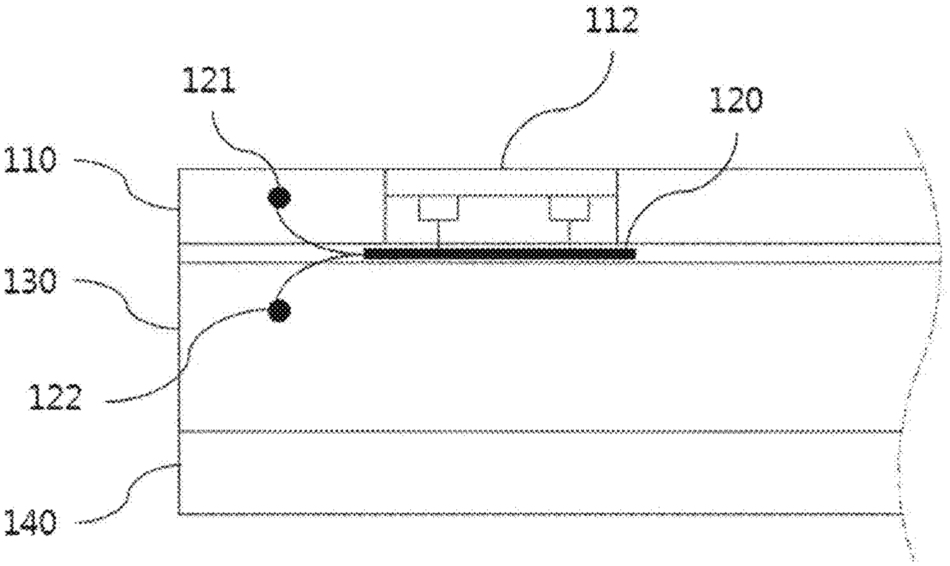
FIG. 7 is a view for explaining a case where a bonding position of a slit portion is formed according to an embodiment of the present disclosure.

FIG. 7 is a view for explaining a case where a bonding position of a slit portion is formed according to an embodiment of the present disclosure.

Referring to FIG. 7, the other end of a first pattern connected to the first bonding position 121 of the first metal layer 110 and the other end of a second pattern connected to the second bonding position 122 of the second metal layer 130 may be connected to a bottom end portion of the wireless IC chip 112, respectively.

Furthermore, the antenna layer 120 may be formed such that one or more antenna patterns are wound around the IC chip receiving portion 111, and one end of a first pattern may be electrically connected to the first bonding position 121 of the first metal layer 110 adjacent to the first slit portion 150*a* by a first preset distance, and formed to extend in a direction continuous with a winding direction of the antenna.

Here, the first bonding position 121 may be a preset position where at least part of the first metal layer 110 provided with the first slit portion 150*a* constitutes a winding of the first pattern.

In addition, in the antenna layer 120, one end of a second pattern may be electrically connected to the second bonding position 122 of the second metal layer 130 adjacent to the second slit portion 150*b* by a first preset distance, and formed to extend in a direction continuous with a winding direction of the antenna.

Here, the second bonding position 122 may be a preset position where at least part of the second metal layer 130 provided with the second slit portion 150*b* constitutes a winding of the second pattern.

More specifically, as described above, the antenna layer 120 may be connected to the first bonding position 121 of the first metal layer 110 where one end of a first pattern is adjacent to the slit portion 150 by a first preset distance.

Furthermore, one end of a second pattern may be electrically connected to the second bonding position 122 of the second metal layer 130 adjacent to the slit portion 150 by a second preset distance, and each of the first pattern and the second pattern may be configured to extend in a direction continuous with a winding direction of the antenna layer 120.

Accordingly, as shown in FIG. 7, at least part of the antenna layer 120 below the first metal layer 110 may be bonded and connected to the slit portion 150.

Here, the position and direction of the first bonding position 121 of the first metal layer 110 or the position and direction of the second bonding position 122 of the second metal layer 130, which are bonded and connected thereto, may be formed in a direction that extends a current direction of the winding pattern of the antenna layer 120.

Furthermore, the first metal layer 110, the second metal layer 130, and the third metal layer 140 may be configured to perform a role similar to one coil to transmit and receive wireless signals to and from an external device such as a card reader on both sides of the wireless IC card 100.

In addition, good antenna characteristics may be formed without providing a separate shielding layer to the wireless IC card 100 or going through a complex manufacturing process.

Figure 8:
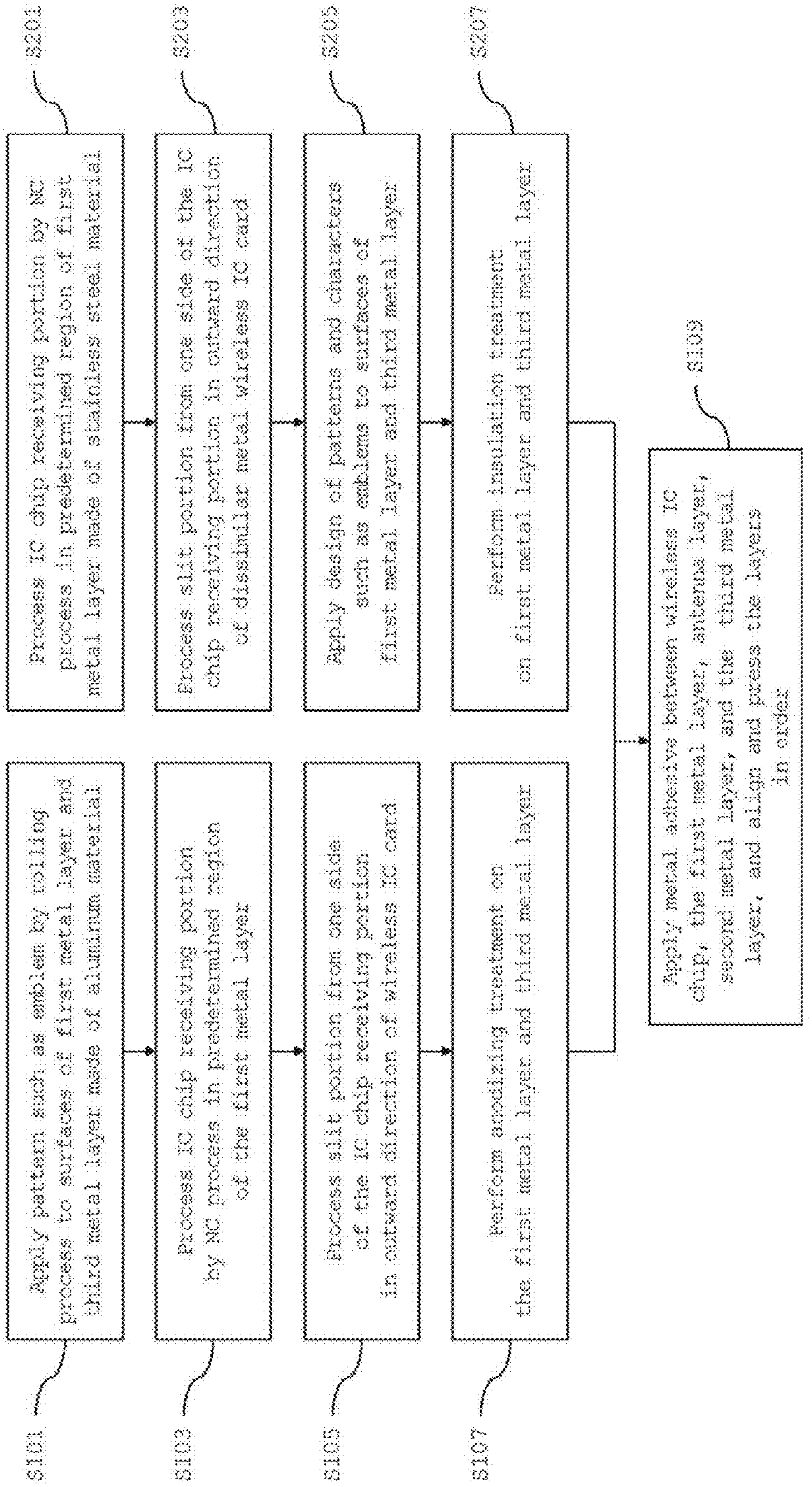
FIG. 8 is a flowchart for explaining a method of manufacturing a wireless IC card according to an embodiment of the present disclosure.

FIG. 8 is a flowchart for explaining a method of manufacturing a wireless IC card according to an embodiment of the present disclosure.

FIG. 8 is a flowchart showing first and second embodiments of a method of manufacturing a wireless IC card according to an embodiment of the present disclosure.

As a first embodiment, a pattern such as an emblem is first applied to surfaces of a first metal layer 110 and a third metal layer 140 made of an aluminum material by a rolling process (S101).

Furthermore, an IC chip receiving portion 111 is processed in a predetermined region of the first metal layer 110 (S103).

Here, the IC chip receiving portion 111 may be formed by opening the first metal layer 110 to an area and depth corresponding to the position and shape of the wireless IC chip 112 through punching processing, etching processing, NC processing, or the like, on the first metal layer 110.

In addition, the first metal layer 110 and the third metal layer 140 made of an aluminum material have strong ductility, thereby allowing the implementation of various patterns such as emblems.

Then, a slit portion 150 is processed from one side of the IC chip receiving portion 111 in an outward direction of the wireless IC card 100 (S105).

Here, the slit portion 150 may include respective slit portions 150*a*, 150*b*, 150*c* of a first slit portion 150*a* formed by cutting in an outward direction of the first metal layer 110 from one side of the IC chip receiving portion 111, a second slit portion 150*b* formed by cutting in an outward direction of the second metal layer 130 so as to face the first slit portion 150*a*, and a third slit portion 150*c* formed by cutting in an outward direction of the third metal layer 140 so as to face the second slit portion 150*b*.

In addition, the slit portion 150*a*, 150*b*, 150*c* may be formed to have a preset width corresponding to a width of the IC chip receiving portion 111 up to the outer edge of the wireless IC card 100, and the preset width may be set to be a narrower or wider width than the width of the IC chip receiving portion 111, or may be set to be the same width.

Then, anodizing for an insulation treatment is carried out on the first metal layer 110 and the third metal layer 140 (S107).

Here, in order to prevent contact corrosion occurring in the first metal layer 110 and the third metal layer 140 due to a potential difference between the first metal layer 110 and the third metal layer 140 using aluminum and the second metal layer 130, anodizing treatment for insulation may be carried out.

Then, a metal adhesive is applied to form a clad metal between the wireless IC chip 112, the first metal layer 110, the antenna layer 120, the second metal layer 130, and the third metal layer 140, and the layers are aligned and pressed in order (S109).

Meanwhile, as a second embodiment, an IC chip receiving portion 111 is first processed in a predetermined region of the first metal layer 110 made of a stainless steel material (S201).

Here, the IC chip receiving portion 111 may be formed by opening the first metal layer 110 to an area and depth corresponding to the position and shape of the wireless IC chip 112 through punching processing, etching processing, NC processing, or the like, on the first metal layer 110.

Then, a slit portion 150 is processed from one side of the IC chip receiving portion 111 in an outward direction of the wireless IC card 100 (S203).

Here, as described above, the slit portion 150 may include respective slit portions 150*a*, 150*b*, 150*c* of a first slit portion 150*a* formed by cutting in an outward direction of the first metal layer 110 from one side of the IC chip receiving portion 111, a second slit portion 150*b* formed by cutting in an outward direction of the second metal layer 130 so as to face the first slit portion 150*a*, and a third slit portion 150*c* formed by cutting in an outward direction of the third metal layer 140 so as to face the second slit portion 150*b*.

Then, a design is applied to surfaces of the first metal layer 110 and the third metal layer 140 (S205).

Here, stainless steel, which is the material of the first metal layer 110 and the third metal layer 140, is difficult to apply a pattern through a rolling process like the aluminum material of the first embodiment, and thus it may be preferable to apply a design through a laser process.

Then, an insulation treatment is carried out on the first metal layer 110 and the third metal layer 140 (S207).

Here, an insulation treatment may be carried out on the first metal layer 110 and the third metal layer 140 using a stainless steel material to prevent contact corrosion with the second metal layer 130 using a different metal.

Then, as in the S109 step described above, an adhesive is applied to form a clad metal between the wireless IC chip 112, the first metal layer 110, the antenna layer 120, the second metal layer 130, and the third metal layer 140, and the layers are aligned and pressed in order (S109).

While the preferred embodiments of the present disclosure have been shown and described above, it will be of course understood by those skilled in the art that various modifications may be made without departing from the gist of the disclosure as defined in the following claims, and it is to be noted that those modifications should not be understood individually from the technical concept and prospect of the present disclosure.

What is claimed is:

1. A wireless IC metal card, the card comprising:

a first metal layer that receives a wireless IC chip on a top surface of the first metal layer;

an antenna layer disposed in a partial region of a bottom surface of the first metal layer and electrically connected to the wireless IC chip;

a second metal layer disposed below the first metal layer, with the antenna layer interposed therebetween; and a third metal layer disposed below the second metal layer, wherein the first metal layer, the second metal layer, and the third metal layer are bonded to one another to form a clad metal structure, wherein the second metal layer has a thickness that is thicker than the first and third metal layers, and a weight that is higher than the first and third metal layers.

2. The card of claim 1, wherein the second metal layer has a metal material that is different from the first and third metal layers, and a weight that is higher than the first and third metal layers.

3. The card of claim 2, wherein the first metal layer and the third metal layer are formed of either aluminum or duralumin, and wherein the second metal layer is formed of either one of nickel or stainless steel material.

4. The card of claim 2, wherein the first metal layer and the third metal layer are made of stainless steel, and wherein the second metal layer is formed of a nickel material.

5. The card of claim 1, wherein a thickness ratio of the first metal layer, the second metal layer, and the third metal layer is 1:2:1.

6. The card of claim 1, wherein the first metal layer comprises an IC chip receiving portion formed by opening a predetermined region to receive the wireless IC chip, and wherein the first metal layer, the second metal layer, and the third metal layer each comprise a slit portion formed by cutting the first metal layer, the second metal layer, and the third metal layer in an outward direction of the wireless IC card from the IC chip receiving portion.

7. The card of claim 6, wherein the slit portion comprises:

a first slit portion formed by cutting in an outward direction of the first metal layer from one side of the IC chip receiving portion;

a second slit portion formed by cutting in an outward direction of the second metal layer to correspond to a cutting direction of the first slit portion; and a third slit portion formed by cutting in an outward direction of the third metal layer to correspond to a cutting direction of the second slit portion.

8. The card of claim 6, further comprising:

one or more finishing members having electrical insulation, the finishing members being inserted into at least one of the first slit portion, the second slit portion, or the third slit portion.

9. The card of claim 1, wherein the antenna layer is formed such that one or more antenna patterns are wound around the IC chip receiving portion, and one end of a first pattern is electrically connected to a first bonding position of the first metal layer adjacent to the first slit portion by a first preset distance, and is formed to extend in a direction continuous with a winding direction of the antenna, and wherein the first bonding position is a position preset such that at least a portion of the first metal layer having the first slit portion constitutes a winding of the first pattern.

10. The card of claim 9, wherein the antenna layer is formed such that the other end of the first pattern is electrically connected to a second bonding position of the second metal layer or the third metal layer adjacent to the second slit portion or the third slit portion by a preset second distance, and extends in a direction continuous with the winding direction of the antenna, and wherein the second bonding position is a position preset such that at least part of a bonded body of the second metal layer and the third metal layer constitutes a winding of the first pattern.

* * * * *